United States Patent [19]

Filzmoser

[11] 4,132,640

[45] Jan. 2, 1979

[54] PROCESS FOR THE HYGIENIC ELIMINATION OF SEWAGE CONTAINING SALT-CONTAINING ORGANIC SUBSTANCES

[75] Inventor: Ernst Filzmoser, Dubendorf, Switzerland

[73] Assignee: Von Roll AG, Gerlafingen, Switzerland

[21] Appl. No.: 795,890

[22] Filed: May 11, 1977

[30] Foreign Application Priority Data

May 17, 1976 [CH] Switzerland ............... 6144/76

[51] Int. Cl.² ............................................... C02B 3/04
[52] U.S. Cl. .................................. 210/68; 210/71;
210/73 S; 210/152; 210/195 R; 210/218
[58] Field of Search .............. 210/63 R, 68, 71, 72,
210/66, 67, 152, 182, 75, 194, 195 R, 218, 73
SG; 110/8 P, 8 R, 7 B

[56] References Cited

U.S. PATENT DOCUMENTS

| 3,907,674 | 9/1975 | Roberts et al. | 210/152 |
| 3,913,500 | 10/1975 | Paccione et al. | 110/8 P |
| 3,918,372 | 11/1975 | Schuster | 110/8 P |
| 3,959,126 | 5/1976 | Millward | 210/68 |
| 4,044,695 | 8/1977 | Mackenzie et al. | 110/8 P |

FOREIGN PATENT DOCUMENTS

354879 2/1971 U.S.S.R. ............................ 210/67

*Primary Examiner*—Charles N. Hart
*Assistant Examiner*—Benoit Castel
*Attorney, Agent, or Firm*—Weingarten, Maxham & Schurgin

[57] ABSTRACT

A process and system for hygienic elimination of sewage having salt-containing organic substances as a constituent thereof. The sewage is concentrated by evaporation and the salt and organic substances are fed into a combustion chamber. The organic substances are burned and the salts are modified in the aggregate state.

13 Claims, 1 Drawing Figure

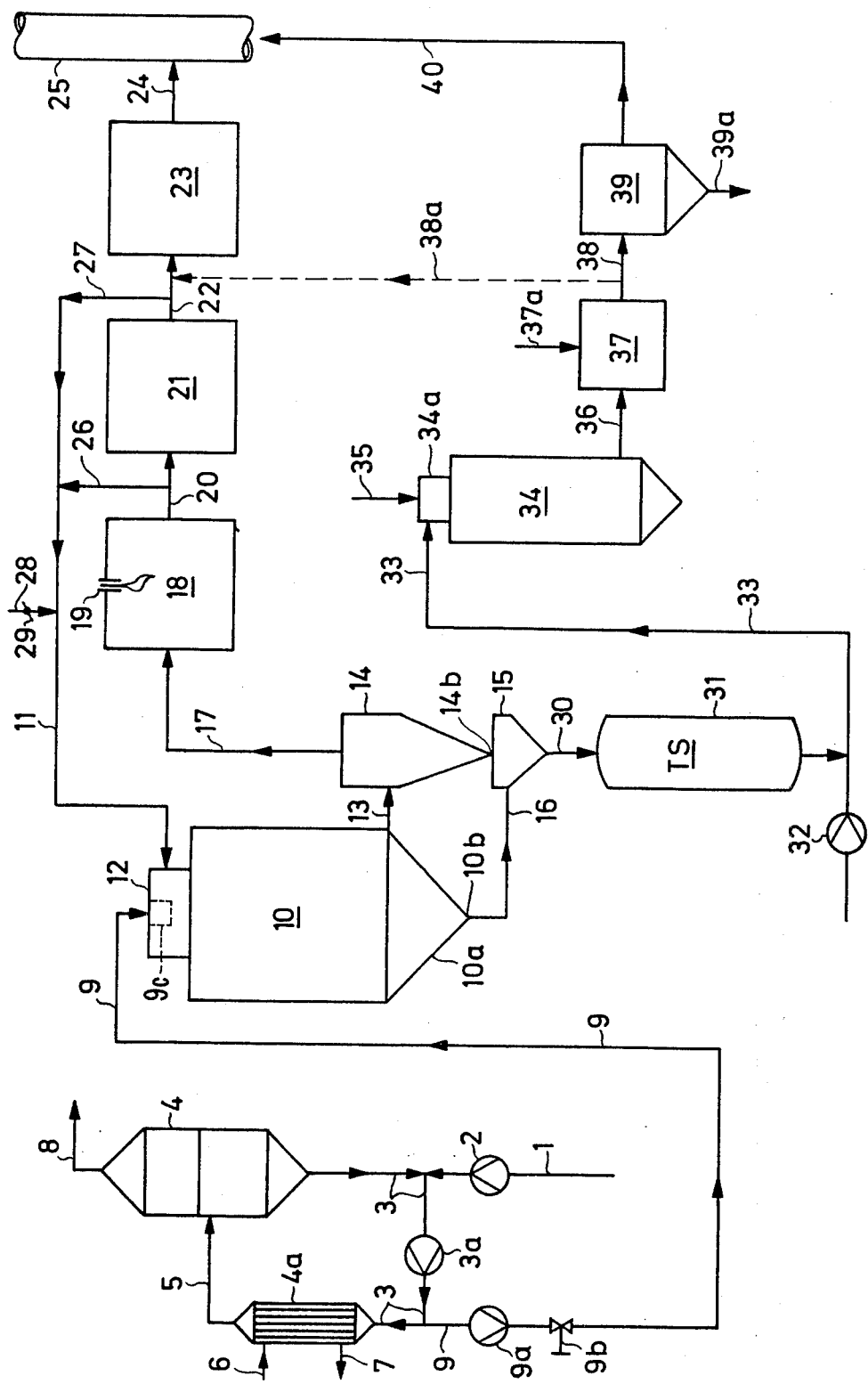

PROCESS FOR THE HYGIENIC ELIMINATION OF SEWAGE CONTAINING SALT-CONTAINING ORGANIC SUBSTANCES

FIELD OF THE INVENTION

The invention relates to a process and a system for the hygienic elimination of sewage which includes salt-containing organic substances in which the sewage is concentrated by evaporation and the salt and organic substances in the sewage are fed into a combustion chamber where the organic substances are burned accompanied by a modification in the aggregate state of the salts.

DISCUSSION OF THE PRIOR ART

In known processes and installations of this type the organic substances are directly burned by feeding into a combustion chamber the salt-containing sewage which has previously been concentrated in an evaporator. In this direct burning process the combustion chamber must be operated at a high combustion temperature whereby the salts are present in the waste gas phase so that the liquid fused salt has a minimum action on the combustion chamber wall and the solidification of entrained salt droplets on the boiler heating surfaces is kept to a minimum. In addition, in the case of direct burning concentration, the thickening of the sewage must not be continued beyond a certain level because it would otherwise be impossible to obtain the advantageous particle sizes of the solid substances necessary for a perfect combustion of the organic substances. However, both the high combustion temperature and the relatively low level of concentration lead to a very high consumption of fuel in this known process, with consequent high operating costs. Furthermore, in such prior processes a high air excess has been necessary in order to have an adequate quantity of oxygen for the combustion of both the fuel and the organic substances. This is because the water which evaporates in the combustion chamber drives out the oxygen. In addition, with the known processes of this type there is a considerable risk that if boiler heating surfaces are connected behind the combustion chamber, boiler tube corrosion will occur, especially on the superheater tubes, accompanied by boiler contamination through corrosion and deposits on the boiler tube which reduce the coefficient of heat transfer. Furthermore, reference is briefly made to tube corrosion caused by corrosive waste gases (which contain HCl as well as $H_2O$, $SO_3$ and $SO_2$) and occurring below NaCl and $Na_2SO_4$-containing tube coatings.

Following the concentration of industrial sewage of the type indicated hereinbefore, it is also known to treat it in a fluidized bed furnace, whereby the organic substances therein are burned. Since, however, the melting points of the salt-rich sludges to be treated in this way are too low, undesired agglomerates can form from the fused salt droplets in a quartz sand fluidized bed which instead of floating are left behind in the fluidized bed, thus impairing the course of combustion.

SUMMARY OF THE INVENTION

According to the invention, the disadvantages of prior art systems mentioned above are obviated by a process wherein the concentrated sewage is initially finely atomized, its remaining water percentage is evaporated by means of a hot gaseous medium accompanied by direct contact and as a result the dry substance in the sewage is separated from its residual aqueous substance. Then the thus obtained dry substance is pneumatically fed into a hot combustion chamber by means of an oxygen-containing carrier gas, whereby due to the rapid heating thereof the salt suddenly passes into the gaseous phase substantially without salt fusion and the organic substances are oxidized, while the hot flue gases formed during the combustion of the organic substances and the salts in the gas phase contained therein are removed from the combustion chamber and rapidly cooled by means of air or water or both. After that the salts are separated from the flue gases, the latter being finally discharged into the atmosphere.

The invention also relates to an installation for performing this process with an evaporator and a combustion chamber connected behind the same wherein between the evaporator and the combustion chamber a spray dryer is provided. The dryer is equipped with separate upper connections for the concentrated sewage and the hot gaseous medium, together with a lower outlet for the dry substance. The combustion chamber is uncooled and is provided with separate upper connections for the dry substance and an additional fuel, as well as a lower outlet for the flue gases and salts in the gas phase.

BRIEF DESCRIPTION OF THE DRAWING

The objects, features and advantages of the invention will be apparent from the following detailed description when read in conjunction with the accompanying drawing FIGURE which represents an embodiment of the installation according to the invention in the form of a flow sheet, also illustrating the process of the invention performed therein.

DESCRIPTION OF THE PREFERRED EMBODIMENT

Industrial sewage which contains a high proportion of salts and organic substances is fed into a pipe 3 via a feed pipe 1 and by means of a feed pump 2. Pipe 3 belongs to an evaporation circuit connecting an evaporator 4 with an external heat exchanger 4a. A circulating pump 3a causes a forced circulation of part of the sewage via pipe 3, heat exchanger 4a, pipe 5, evaporator 4 and back through pipe 3. In this case the heat exchanger 4a is heated by means of boiler steam which is supplied to it by an appropriate source through pipe 6 and is led from it via pipe 7 in the form of condensate. The water vapor formed from the sewage during the evaporation process is removed from the evaporator 4 via a pipe 8. Part of the concentrated or thickened sewage resulting from the water evaporation process is fed in regulatable quantities by means of a pump 9a via a valve 9b through a pipe 9 to a spray dryer 10. The concentrate is sprayed into the upper part of dryer 10 after being brought into finely dispersed form by an appropriate apparatus such as a centrifugal atomizer 9c. Hot flue gases at a temperature of about 600° C. are fed through a pipe 11 to a flue gas distributor 12 equipped with adjustable guide blades and arranged on the top of spray dryer 10, and consequently into the dryer. Thus, the hot flue gas enters the top of the spray dryer 10 in parallel flow with the concentrate and comes into direct contact therewith directly following the atomization of the concentrate. This leads to a sudden large scale evaporation of the water in the concentrate causing a rapid temperature drop in the hot flue gases.

The fine solid particles still entrained by the drying vapors are separated in a separator 14, preferably of the cyclone type, which is connected to the spray dryer 10 by means of a pipe 13. These solid particles pass through a solids outlet 14b of cyclone separator 14 into a storage tank 15 while the dry substance separated in the drying chamber of spray dryer 10 is also conveyed into storage tank 15 by means of a pipe 16. The drying vapors which entrain the readily volatile organic substances released during drying are conveyed upward from cyclone separator 14 through a pipe 17 into a vapor combustion chamber 18 where they are burned by means of an additional fuel supplied by a burner 19. The resulting hot flue gases are fed by means of a pipe 20 to a boiler 21 and from the latter via a pipe 22 to a filter 23 from where, after cleaning, they are discharged into the atmosphere through a pipe 24 and a chimney 25. The hot flue gases supplied to spray dryer 10 by pipe 11 are derived from the flue gas pipe 20 via a pipe 26 and the somewhat lower temperature hot flue gases from pipe 22 behind boiler 21 which are connected to pipe 11 by a pipe 27. These two sources of hot flue gases can be combined for temperature regulation purposes. It is also possible to feed cold air into flue gas pipe 11 by means of a pipe 28 through a valve 29 so that the temperature of the hot flue gases supplied to spray dryer 10 can be further regulated. The water vapor produced in boiler 21 can be supplied by pipe 6 to heat exchanger 4a which serves to concentrate the sewage.

At the bottom 10a of spray dryer 10 the dry substance of the sewage passes out through an outlet 10b with a temperature of, for example, approximately 100° C., whereby the average particle size of the solid particles is about 50 to 100 microns. Tests have shown that at this temperature no reactions take place between the organic constituents in the dry substance. The solid particles, which are mainly salts, pass from storage tank 15 through a pipe 30 into a salt silo 31 which serves as a buffer tank.

The dry substance TS is fed pneumatically from silo 31 by means of a carrier air fan 32 through a pipe 33 into the top part 34a of an uncooled combustion chamber 34. An additional fuel such as, for example, heavy oil or fuel gas can also be fed to the top part 34a of combustion chamber 34 in regulatable quantities by means of a fuel line 35. As a result, on starting up the installation combustion chamber 34 can be brought to the necessary combustion temperature and in addition the necessary operating temperature in combustion chamber 34 can be maintained during the operation of the installation if the supply of organic substances is inadequate and/or the latter have too low a calorific value. Due to the temperature of 1100° C. existing in the combustion chamber 34 in the present case, the salts are converted into the gas phase so rapidly that virtually no salt fusion can be observed, while the organic substances are completely oxidized by means of the oxygen in the carrier air.

The flue gases resulting from the combustion of the organic substances in combustion chamber 34, together with the salts in the gas phase which they entrain are laterally drawn off in the lower part of combustion chamber 34 and are supplied by a pipe 36 to a gas cooler 37 in which they are rapidly cooled by direct contact with cold water or cold air fed in by a pipe 37a, whereby the salts are rapidly converted back from the gas phase into the solid aggregate state.

From gas cooler 37 the cooled salt-containing flue gases are fed through a pipe 38 to a cloth filter 39 which cleans them, after which they are discharged into the atmosphere via a pipe 40 and a chimney 25. At outlet 39a the salts are removed in solid form from filter 39. The drawing indicates by means of dotted line 38a that the flue gases formed in combustion chamber 34 and subsequently cooled in gas cooler 37 could optionally also be passed into filter 23 for the drying vapors and then through pipe 24 into chimney 25.

Tests have confirmed that when the combustion chamber 34 is at a temperature of 1100° C. the salts are converted into the gas phase without any salt fusion taking place. Further tests revealed no sulphide compounds in the flue gas samples after cooling the flue gases by air to about 200° C. The complete combustion of the organic substances is therefore possible under the conditions described. No reduction of sodium sulphate ($Na_2SO_4$) to sodium sulphide ($Na_2S$) was observed.

As a modification to the above-described process, it would also be possible to burn the dry substance in a cooled combustion chamber with salt bath and liquid removal of the fused salt, but then much more stringent requirements would have to be made on the monitoring of the operation. This is due to the fact that this combustion process permits virtually no temperature fluctuations in the combustion chamber because, on the one hand, the combustion temperature must not be too low otherwise thorough combustion of the organic substances does not take place, and on the other hand the combustion chamber temperature must not be too high, otherwise the salts of the dry substance will be converted into the gas phase. It has also been found that the fused mass is not completely free from organic substances.

In place of a single stage evaporator, it would also be possible to use a multi-stage, for example, a three stage evaporator, whereby the individual evaporating stages could be connected in series. For heating the external heat exchanger of the evaporator, it would be possible to use in place of water vapor from a boiler hot flue gases or drying vapors which, while continuously circulating in a vapor circuit, could be heated by hot flue gases in a separate heat exchanger. Instead of using a cloth filter for the combustion chamber flue gases, it would also be possible to use an electrostatic precipitator. In addition the salt could be separated in an aqueous phase instead of in the solid phase.

A particular advantage of the process or installation according to the invention is that the operating costs are much lower than in a conventional process because the combustion of the organic substance requires no additional fuel or at the most a small quantity of additional fuel. This is because in the case of the uncooled combustion chamber it is only necessary to make good the relatively small heat losses occurring on the outer enclosing walls thereof. The fuel consumption is therefore much lower in the process according to the invention than in comparable conventional processes. In addition, there is also no need for the hitherto necessary high air excess which is due to the fact that the evaporating water displaces the oxygen necessary for burning both the additional fuel and the organic substance itself because in the process according to the invention no water is introduced into the combustion chamber. Furthermore, when a waste heat boiler is provided the process according to the invention makes it possible to eliminate severe boiler tube corrosion and boiler contamination which may occur with conventional processes, leading to a much longer operating cycle than in conventional installations. A further important advantage of the process according to the invention is that due to the combustion chamber temperature being above the salt melting point, thermally stable organic compounds such as can be present in sewage resulting from the production of xenobiotics such as, for example, week killers and insecticides, can now be satisfactorily and reliably oxidized.

Thus, the process according to the invention and the installation for performing the same is in no way limited to the embodiment shown in the drawing and performance details can be varied at random without passing beyond the scope of the invention.

What is claimed is:

1. A process for the hygienic elimination of sewage which includes salt-containing organic substances, said process comprising the steps of:
    concentrating the sewage by evaporation;
    atomizing the concentrated sewage to a finely dispersed form;
    combining the atomized concentrated sewage with hot gases at a temperature of about 600° C. in a dryer, thereby substantially completely removing the residual water content thereof by evaporation;
    separating the thus obtained dry substance of the atomized, concentrated and evaporated sewage from the residual aqueous drying vapors said steps of combining the atomized concentrated sewage and separating said sewage from the residual aqueous drying vapors resulting in readily volatile organic substances being released with said drying vapors;
    burning the readily volatile organic substances in the residual aqueous drying vapors; from said burning step as said hot gases in said combining step for evaporation of the atomized, concentrated sewage;
    feeding said dry substances into a hot combustion chamber by means of an oxygen-containing carrier gas;
    heating the dry substance in said combustion chamber to a temperature of about 1100° C. so rapidly that the salt content of the sewage is converted substantially instantaneously from its solid aggregate state in said dry substance into the gaseous phase and therefore substantially without salt fusion;
    oxidizing the organic substances in the sewage by heating in said hot combustion chamber;
    removing the hot flue gases formed during combustion of the organic substances in the hot combustion chamber together with the salts in the gas phase from said hot combustion chamber;
    cooling the hot flue gases and gaseous salts contained therein from said hot combustion chamber to a temperature of about 200° C. in such a rapid manner so that said gaseous salts are converted back into the solid aggregate state; and
    separating the salts from the flue gases, and discharging said gases into the atmosphere.

2. The process recited in claim 1 and comprising the further steps of:
    feeding the remaining portion of the flue gases resulting from combustion of the readily volatile organic substances to a waste heat boiler;
    cleaning said remaining flue gases;
    discharging the cleaned remaining flue gases to the atmosphere; and
    regulating the temperature of said first portion of the resulting flue gases by combining with cooler gases.

3. The process recited in claim 2 and comprising the further step of regulating the temperature of said first portion of the resulting flue gases by combining with a first portion of the flue gases from said waste heat boiler.

4. The process recited in claim 1 and comprising the further steps of:
    separating the salts from the cooled flue gases; and
    discharging the flue gases into the atmosphere.

5. The process recited in claim 3 and comprising the further step of combining the salt-containing flue gases from said cooling step with the remaining portion of the flue gases from said waste heat boiler before said cleaning and discharging steps.

6. The process recited in claim 1 wherein the residual aqueous drying vapors separated from said atomized concentrated evaporated sewage contains fine solid particles entrained therein, said process comprising the further steps of:
    separating the fine solid particles entrained by the residual aqueous drying vapors in said first enumerated separating step from the drying vapors; and
    feeding said fine solid particles to said hot combustion chamber together with the dry substance from said first feeding step.

7. The process recited in claim 2 and comprising the further step of utilizing water vapor produced in said waste heat boiler as a heat carrier in said concentrating step.

8. The process recited in claim 1 wherein said cooling step of hot flue gases and gaseous salts from said hot combustion chamber is accomplished by direct contact with cool air.

9. The process recited in claim 1 wherein said cooling step of hot flue gases and gaseous salts from said hot combustion chamber is accomplished by direct contact with cool water.

10. The process recited in claim 1 wherein said cooling step of hot flue gases and gaseous salts from said hot combustion chamber is accomplished by direct contact with cool air and cool water.

11. The process recited in claim 1 wherein said hot gases used for evaporation in said combining step flow in parallel with the concentrated, atomized sewage into said dryer.

12. A system for the hygienic elimination of sewage which includes salt-containing organic substances, said system comprising: means for feeding the sewage into said system;
    means for concentrating the sewage by evaporation;
    atomizer means for reducing the concentrated sewage to finely dispersed form;
    a spray dryer;
    first conduit means for feeding the concentrated sewage from said concentrating means to said reducing means;
    means coupling said reducing means to said dryer to enable said finely dispersed concentrated sewage to pass to said dryer;
    means connected to said dryer for supplying a hot gaseous medium thereto for drying the concentrated sewage, said hot gaseous medium and said finely dispersed concentrated sewage flowing in substantially parallel manner into said dryer;

a first outlet in said dryer for removal of the dry substance of the sewage therefrom;

an uncooled combustion chamber;

second conduit means connected between said first outlet and said uncooled combustion chamber;

means connected to said uncooled combustion chamber for supplying additional fuel thereto;

a second outlet in said uncooled combustion chamber for removal of the flue gases and salts in the gas phase therefrom;

a third outlet in said dryer for removing drying vapors having fine solid particles entrained therein;

a cyclone separator connected to said third outlet for separating the drying vapors from the fine solid particles;

a fourth outlet in said separator for removing the fine solid particles therefrom;

a storage tank;

means for connecting said first and fourth outlets to said storage tank;

a salt silo;

third conduit means connecting said salt silo and said storage tank; and a fan connected in said second conduit means for supplying combustion air to said uncooled combustion chamber, said air also serving as a means to feed material from said salt silo to said uncooled combustion chamber.

13. The system recited in claim 12 and further comprising:

a gas distributor having adjustable guide blades for the hot gaseous medium;

said atomizer and said gas distributor being mounted to said dryer, said atomizer being coupled between said dryer and said first conduit means said gas distributor being coupled between said dryer and said hot gaseous medium connecting means.

* * * * *